(12) United States Patent
Tsai (10) Patent No.: US 10,619,715 B2
(45) Date of Patent: Apr. 14, 2020

(54) LINEAR ACTUATOR

(71) Applicant: MOTECK ELECTRIC CORP., New Taipei (TW)

(72) Inventor: Pen-Yuan Tsai, New Taipei (TW)

(73) Assignee: MOTECK ELECTRIC CORP., New Taipei (TW)

( * ) Notice: Subject to any disclaimer, the term of this patent is extended or adjusted under 35 U.S.C. 154(b) by 0 days.

(21) Appl. No.: 16/285,838

(22) Filed: Feb. 26, 2019

(65) Prior Publication Data

US 2019/0271380 A1    Sep. 5, 2019

(30) Foreign Application Priority Data

Mar. 5, 2018   (TW) .............................. 107202860 U (51) Int. Cl.
  *F16H 25/20*        (2006.01)
(52) U.S. Cl.
  CPC ....... *F16H 25/20* (2013.01); *F16H 2025/209* (2013.01)
(58) Field of Classification Search
  CPC ............... F16H 25/20; F16H 2025/209; F16H 2025/2081
  See application file for complete search history.

(56) References Cited

U.S. PATENT DOCUMENTS

| | | | | |
|---|---|---|---|---|
| 4,702,668 A | * | 10/1987 | Carlisle | B25J 9/044 414/744.5 |
| 4,712,441 A | * | 12/1987 | Abraham | F16H 25/2015 74/412 TA |
| 4,858,481 A | * | 8/1989 | Abraham | F16H 25/2015 74/89.38 |
| 4,889,002 A | * | 12/1989 | Abraham | F16H 25/2015 74/89.38 |
| 5,144,851 A | * | 9/1992 | Grimm | B64C 13/36 74/89.26 |
| 5,214,972 A | * | 6/1993 | Larson | F16H 25/205 74/89.26 |
| 5,809,833 A | * | 9/1998 | Newport | F16H 25/20 192/141 |
| 5,865,272 A | * | 2/1999 | Wiggins | F16H 25/2018 185/40 R |
| 5,910,692 A | * | 6/1999 | Saeda | F16H 25/20 310/13 |

(Continued)

*Primary Examiner* — David M Fenstermacher
(74) *Attorney, Agent, or Firm* — Muncy, Geissler, Olds & Lowe, P.C.

(57) ABSTRACT

A linear actuator includes an actuator body including a housing, a gear set mounted inside the housing, a drive unit mounted outside the housing for rotating the gear set, a transmission mechanism including a lead screw with an axial rod at one end thereof fastened to the gear set, a stopper component set fastened to a neck of the axial rod, two bearing housings mounted on the axial rod at two opposite ends of the neck and two thrust bearings respectively mounted in the bearing housings. When the lead screw is rotated, a first stopper block of the stopper component set is engaged with the neck of the axial rod to force the stopper component set against the thrust bearings, enabling the linear actuator to carry greater axial thrust or tensile load, increasing the high impact load strength of the linear actuator and ensuring overall structural stability and reliability.

10 Claims, 8 Drawing Sheets

(56) References Cited

U.S. PATENT DOCUMENTS

| | | | | |
|---|---|---|---|---|
| 6,234,034 B1* | 5/2001 | Ando | ............... | F16H 25/2472 |
| | | | | 187/267 |
| 6,240,797 B1* | 6/2001 | Morishima | ......... | F16H 25/2454 |
| | | | | 188/134 |
| 6,756,707 B2* | 6/2004 | Hochhalter | ............. | F16H 25/20 |
| | | | | 310/20 |
| 7,922,181 B2* | 4/2011 | Hakui | ................. | B60G 15/063 |
| | | | | 267/175 |
| 8,061,490 B2* | 11/2011 | Di Stefano | ............. | B60T 13/02 |
| | | | | 188/156 |
| 8,146,991 B2* | 4/2012 | Stanz | .................. | B60N 2/0232 |
| | | | | 297/344.13 |
| 8,256,313 B2* | 9/2012 | Ganter | ................... | F16H 25/20 |
| | | | | 74/335 |
| 8,272,284 B2* | 9/2012 | Tateishi | ............. | F16H 25/2015 |
| | | | | 74/89.23 |
| 8,635,927 B2* | 1/2014 | Akashi | .................... | F16H 61/28 |
| | | | | 74/473.36 |
| 8,715,132 B2* | 5/2014 | Kopecek | ................ | F02K 1/763 |
| | | | | 475/329 |
| 8,960,031 B2* | 2/2015 | Keech | ....................... | B64C 5/02 |
| | | | | 74/89.26 |

* cited by examiner

LINEAR ACTUATOR

This application claims the priority benefit of Taiwan patent application number 107202860, filed on Mar. 5, 2018.

BACKGROUND OF THE INVENTION

1. Field of the Invention

The present invention relates to linear actuator technology and more particularly, to a linear actuator, which has a gear set of an actuator body thereof coupled with an axial rod of a lead screw, and a stopper component set fastened to a neck of the axial rod of the lead screw for stopping against a thrust bearing in a respective bearing housing upon rotation of the lead screw so that the linear actuator can carry greater axial thrust or tensile load and has high impact load strength to prevent breaking of the lead screw during operation.

2. Description of the Related Art

Many different types of linear actuators with different mechanical and transmission designs are known for use in medical or residential beds, massage chairs, fitness and rehabilitation related equipment, door/window opening machine, lifting mechanism or other equipment for elevation or angular position adjustment. During the operation of a motor in a conventional linear actuator, a worm is used to drive a worm wheel in rotating a lead screw, or a main shaft is used to drive a gear set in rotating a lead screw, thereby causing an actuation member to move a telescopic tube linearly. When the motor is activated to rotate the lead screw through a worm and a worm wheel (or through a main shaft and a gear set, the transmission power is very large. Thus, when the motor is stopped, it is easy to reverse the lead screw due to the gravity, and the telescopic tube set will quickly drop and cannot be stopped immediately. Therefore, linear actuator manufacturers may install a brake device in the linear actuator to stop the lead screw to provide a braking effect when the linear actuator is stopped. During rotation of the lead screw of the linear actuator, the pin mounted in a pin hole on the lead screw is stopped between two thrust bearings in respective bearing housings to deliver the loading force so that the lead screw will not fall out of the housing during its rotation and can smoothly move the telescopic tube set or the external device for linear movement or rotary motion. However, if the lead screw bears an excessively large torque load, the sudden impact may cause the lead screw to break at the area around the pin hole. The design of the pin hole on the lead screw weakens the cross-sectional strength of the lead screw. The lead screw can break at the area around the pin hole when it bears an excessively large torque load, causing uncertain danger. An improvement in this regard is necessary.

SUMMARY OF THE INVENTION

The present invention has been accomplished under the circumstances in view. It is one object of the present invention to provide a linear actuator, which comprises an actuator body and a stopper component set. The actuator body comprises a housing defining therein an accommodation chamber, a gear set accommodated in the accommodation chamber, a drive unit mounted outside the housing and adapted for rotating the gear set and a transmission mechanism. The transmission mechanism comprises a lead screw extending out of the housing and having an axial rod located at one end thereof and connected to the gear set and a neck located on the axial rod, two bearing housings respectively sleeved onto the axial rod and respectively disposed adjacent to opposing front and rear ends of the neck to face each other, and two thrust bearings respectively mounted in the bearing housings around the axial rod. The stopper component set comprises a first stopper block fastened to the neck, a second stopper block fastened to the neck, and a fastening member fastening the first stopper block and the second stopper block together. The first stopper block comprises an attachment hole located at the center thereof and radially attached to the neck, and a mating connection groove extended from the attachment hole. The second stopper block is inserted into the mating connection groove, comprising an inwardly curved wall attached onto said neck to abut against the attachment hole. When the lead screw is rotated forward or backward, the stopper component set is forced to axially stop against one respective thrust bearing, enabling the linear actuator to carry greater axial thrust or tensile load and increasing the high impact load strength of the linear actuator. Further, this design eliminates the necessity to create a pin hole through the lead screw for the insertion of a pin. Creating a pin hole through the lead screw will reduce the cross-sectional strength of the lead screw, and the lead screw can break at the area around pin hole upon an impact when the lead screw bears excessive torque load. Thus, the design of the present invention ensures the transmission stability and reliability of the lead screw.

According to another aspect of the present invention, when mounting the stopper component set on the lead screw, attach an attachment hole of the first stopper block onto the neck of the axial rod of the lead screw to force a protruding portion in the attachment hole into engagement with a position-limiting groove on the neck, and then insert the second stopper block into a mating connection groove in the first stopper block. At this time, an inwardly curved wall of the second stopper block mate with the attachment hole of the first stopper block to form a round hole that receives the neck of the lead screw. Thereafter, a fastening member is inserted through a through hole on the first stopper block and a through hole on the second stopper block to fasten the first stopper block and the second stopper block together. The structural design of the stopper component set can be installed on the neck of the lead screw without affecting the structural strength of the lead screw, thereby achieving security requirements.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 5:
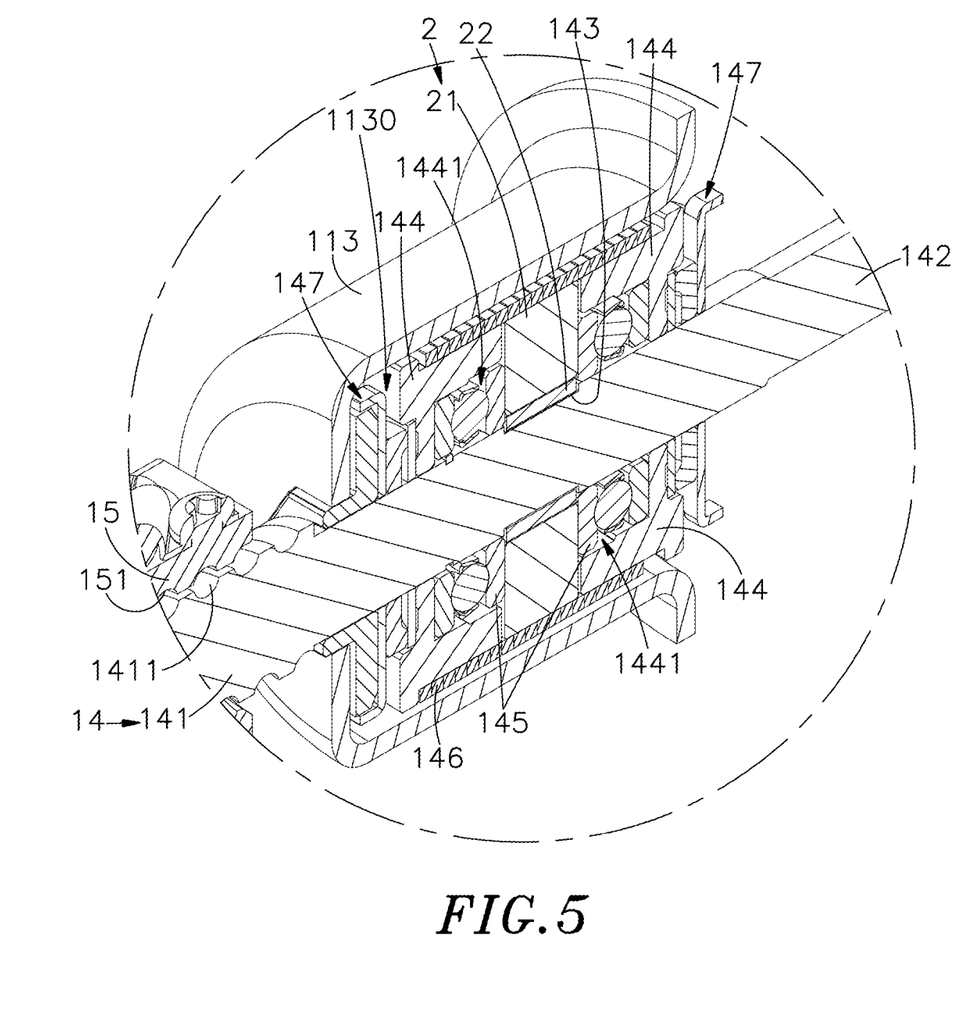
FIG. 5 is a sectional elevation of a part of the linear actuator in accordance with the present invention.
Figure 6:
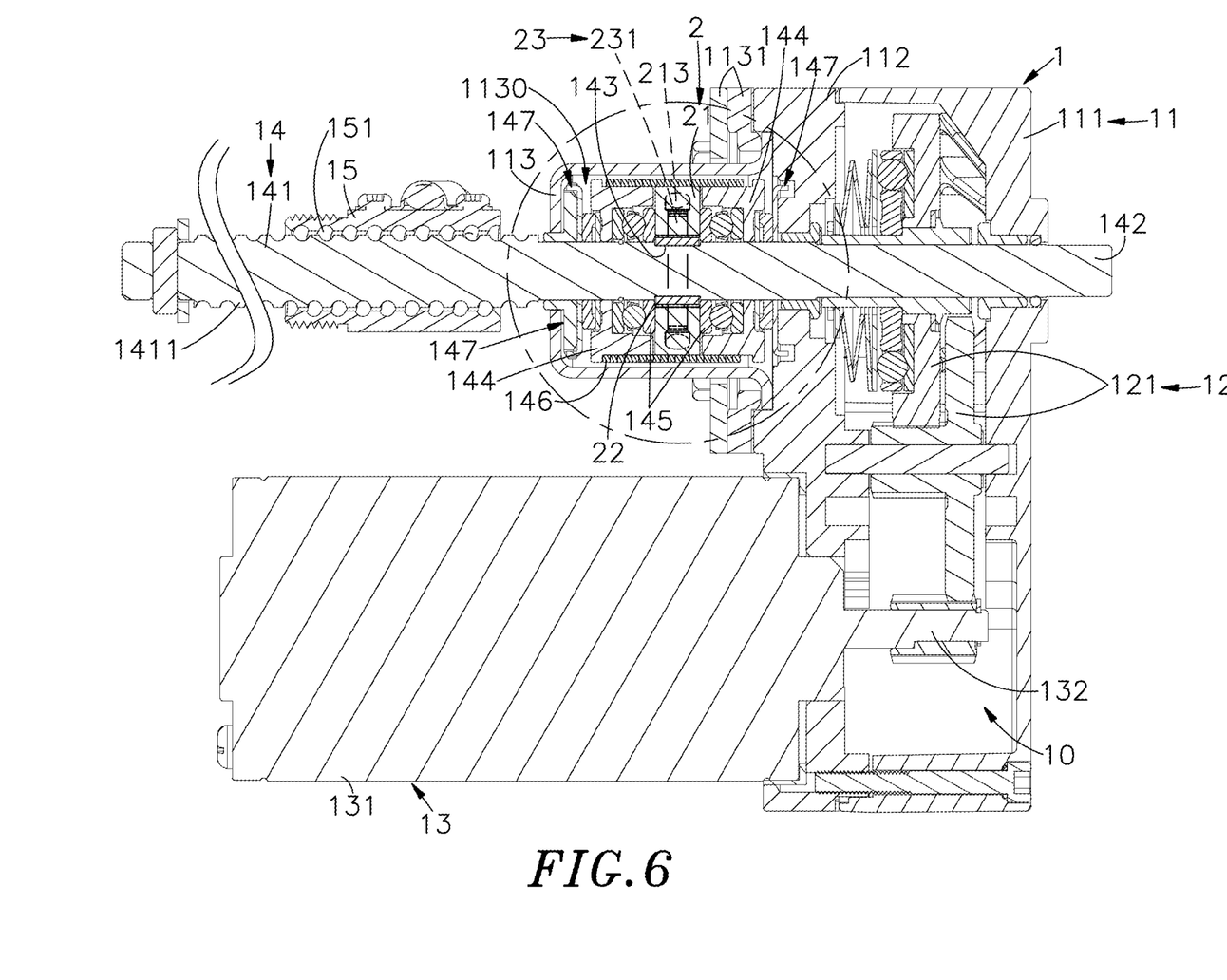
FIG. 6 is a sectional side view of the linear actuator in accordance with the present invention.

Referring to FIGS. 1-8, an oblique top elevational view of a linear actuator in accordance with the present invention, an exploded view of the linear actuator, a partial exploded view of the linear actuator, another exploded view of the linear actuator, a partial sectional elevation of the linear actuator, a sectional side view of the linear actuator, an enlarged view of a part of FIG. 6 and a sectional front view of the linear actuator are shown. As illustrated, the linear actuator comprises an actuator body 1 and a stopper component set 2.

The actuator body 1 comprises a housing 11, which defines therein an accommodation chamber 10 that has an opening 101 on each of opposing front and rear sides thereof, a gear set 12 mounted in the accommodation chamber 10, a drive unit 13 externally mounted to the housing 11, and a transmission mechanism 14 coupled to the gear set 12. The gear set 12 comprises a plurality of meshed gears (worm gears or spur gears) 121, and a mounting through hole 1211 cut through the center of one of the meshed gears 121. The drive unit 13 comprises a motor 131, and a drive shaft (such as a worm or a shaft fixedly mounted with pinion) 132 inserted into the housing 11 and meshed with the gear set 12 and drivable by the motor 131 to rotate the gear set 12. The transmission mechanism 14 comprises a lead screw 141 disposed in a parallel (or perpendicular) relationship with the motor 131.

The housing 11 comprises a body shell 111, and a cover plate 112 and an outer casing 113 assembled at the front side of the body shell 111. The accommodation chamber 10 is defined within the body shell 111. The cover plate 112 is affixed to the front side of the body shell 111 with screws to close the opening 101 in the front side of the accommodation chamber 10. A hollow holding down member 1131 is mounted around the outer casing 113 and affixed to the cover plate 112 with screws to firmly secure the outer casing 113 to the outside wall of the cover plate 112 in a protruding manner. The outer casing 113 defines therein a receiving chamber 1130 that cuts through opposing front and back sides of the outer casing 113. The lead screw 141 of the transmission mechanism 14 has an axial rod 142 axially extended from one end thereof and coaxially inserted through the mounting through hole 1211 of the meshed gear 121. The axial rod 142 has a neck 143, and a position-limiting groove (such as keyway) 1431 axially located on the periphery of the neck 143.

Figure 1:
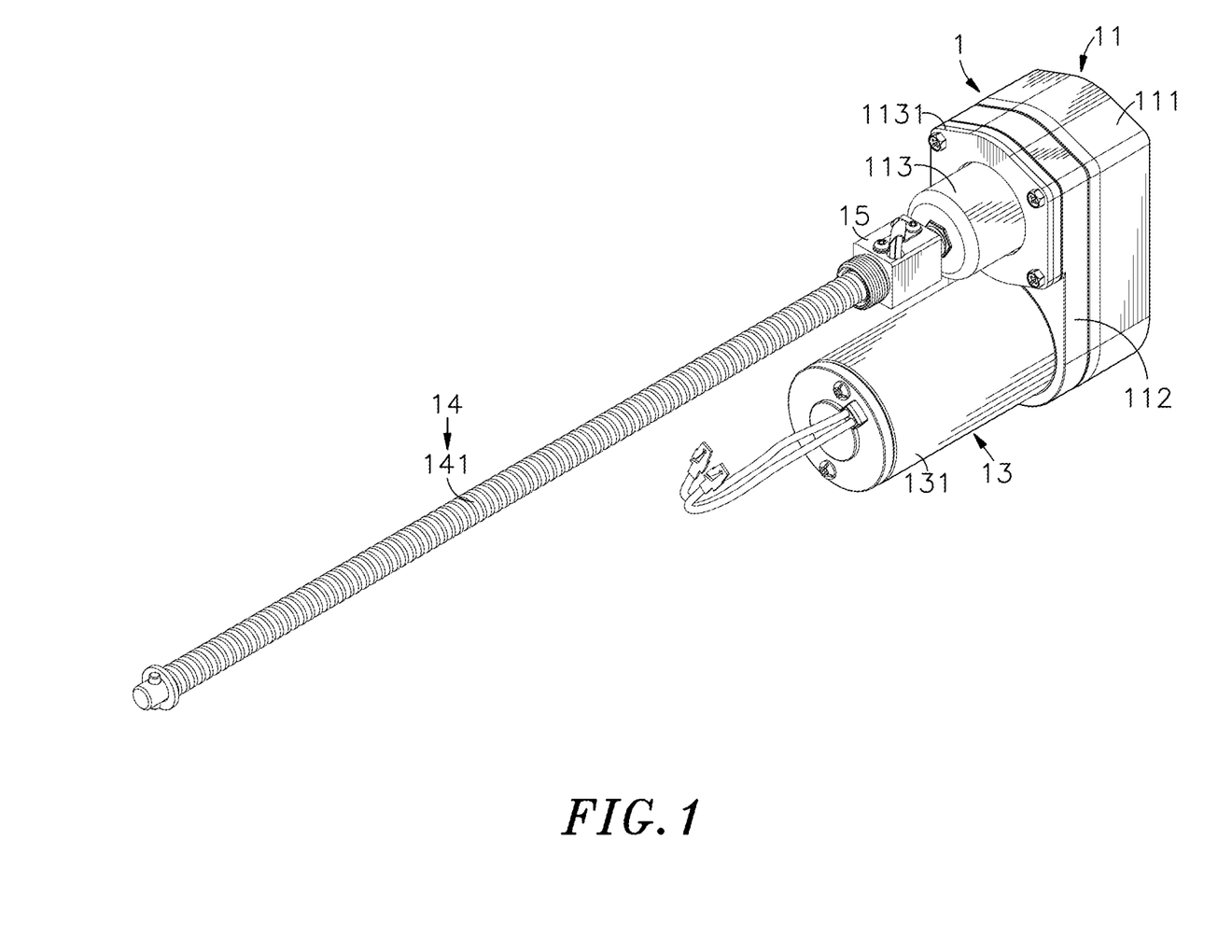
FIG. 1 is an oblique top elevational view of a linear actuator in accordance with the present invention.
Figure 2:
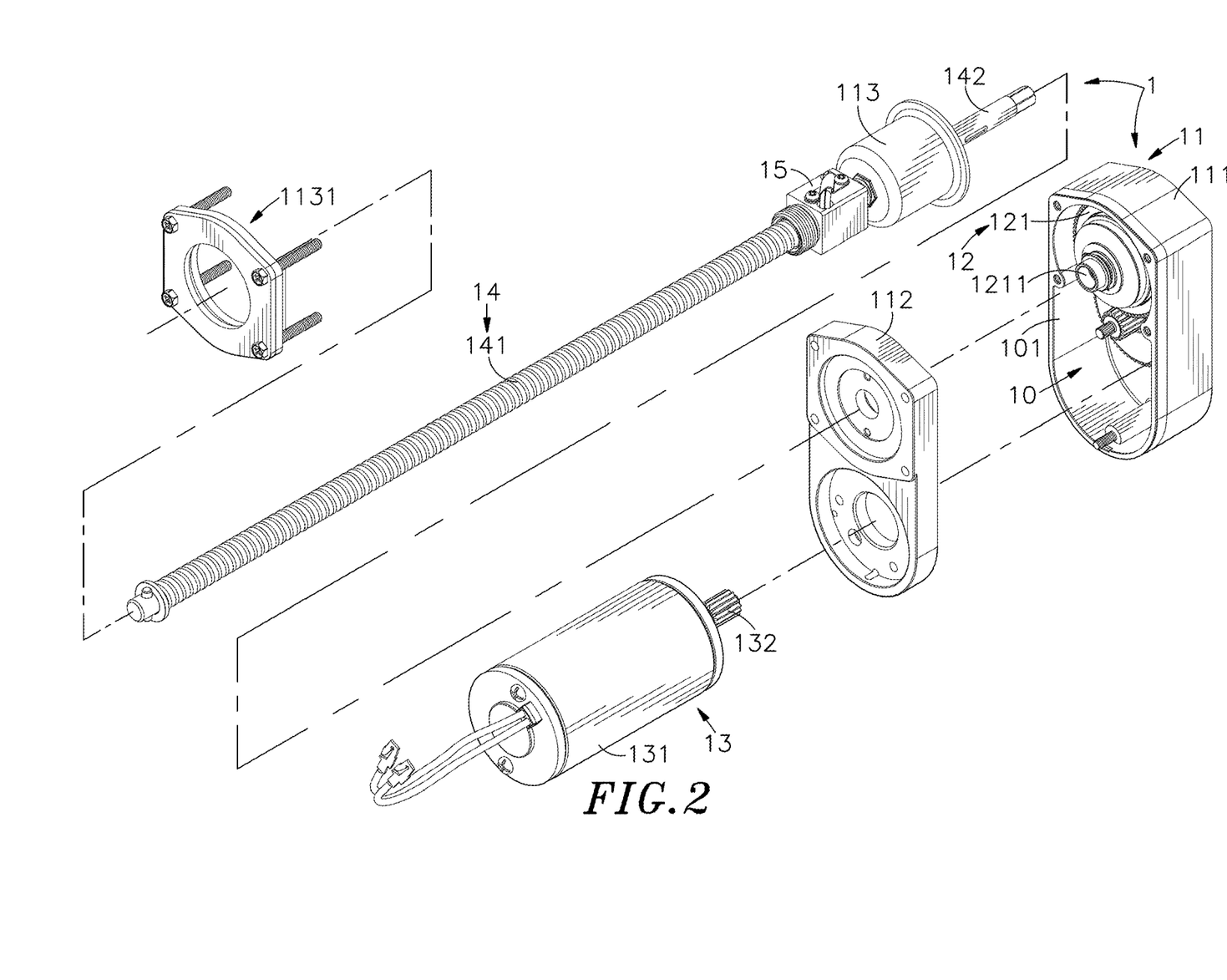
FIG. 2 is an exploded view of the linear actuator in accordance with the present invention.
Figure 3:
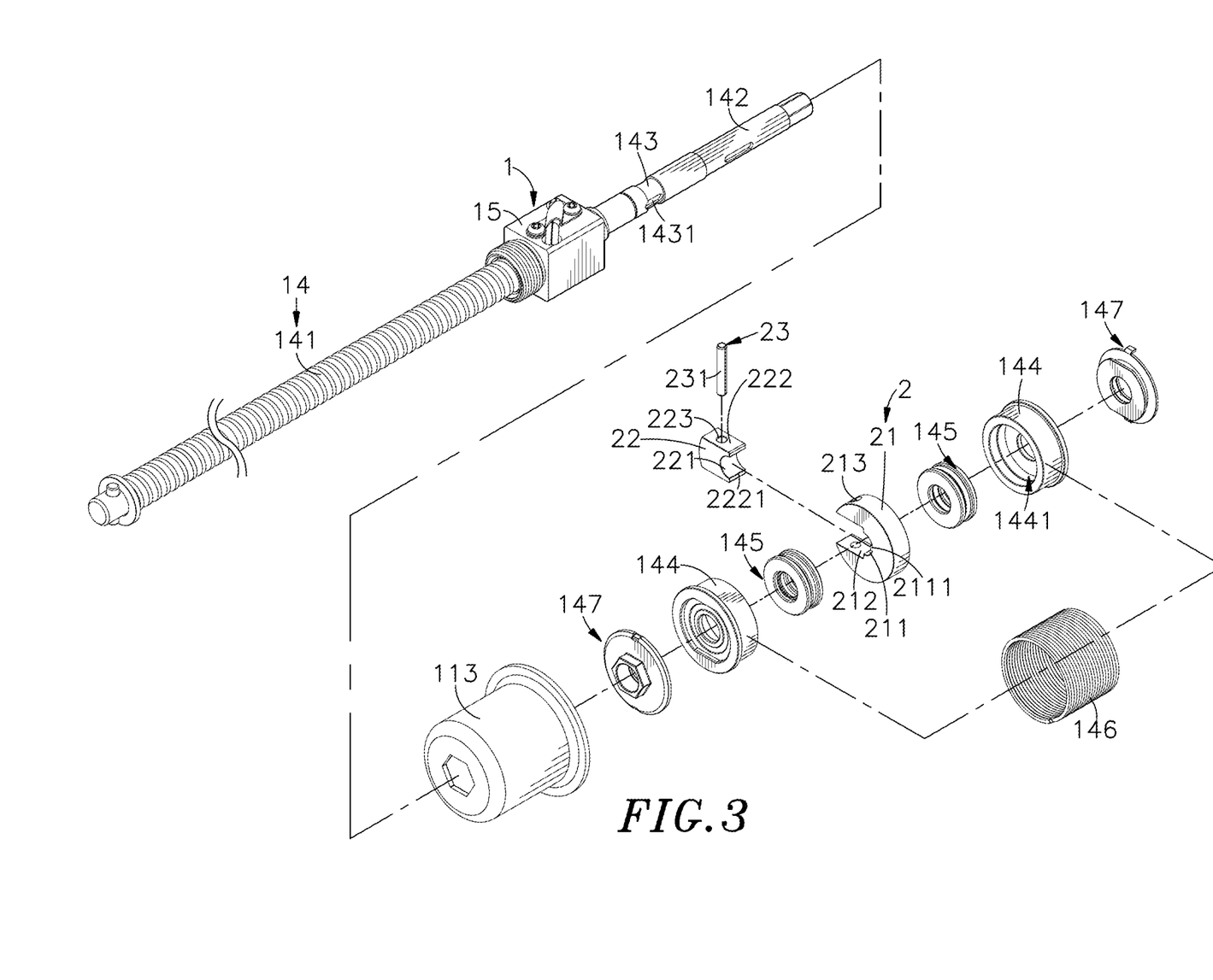
FIG. 3 is an exploded view of a part of the linear actuator in accordance with the present invention.
Figure 4:
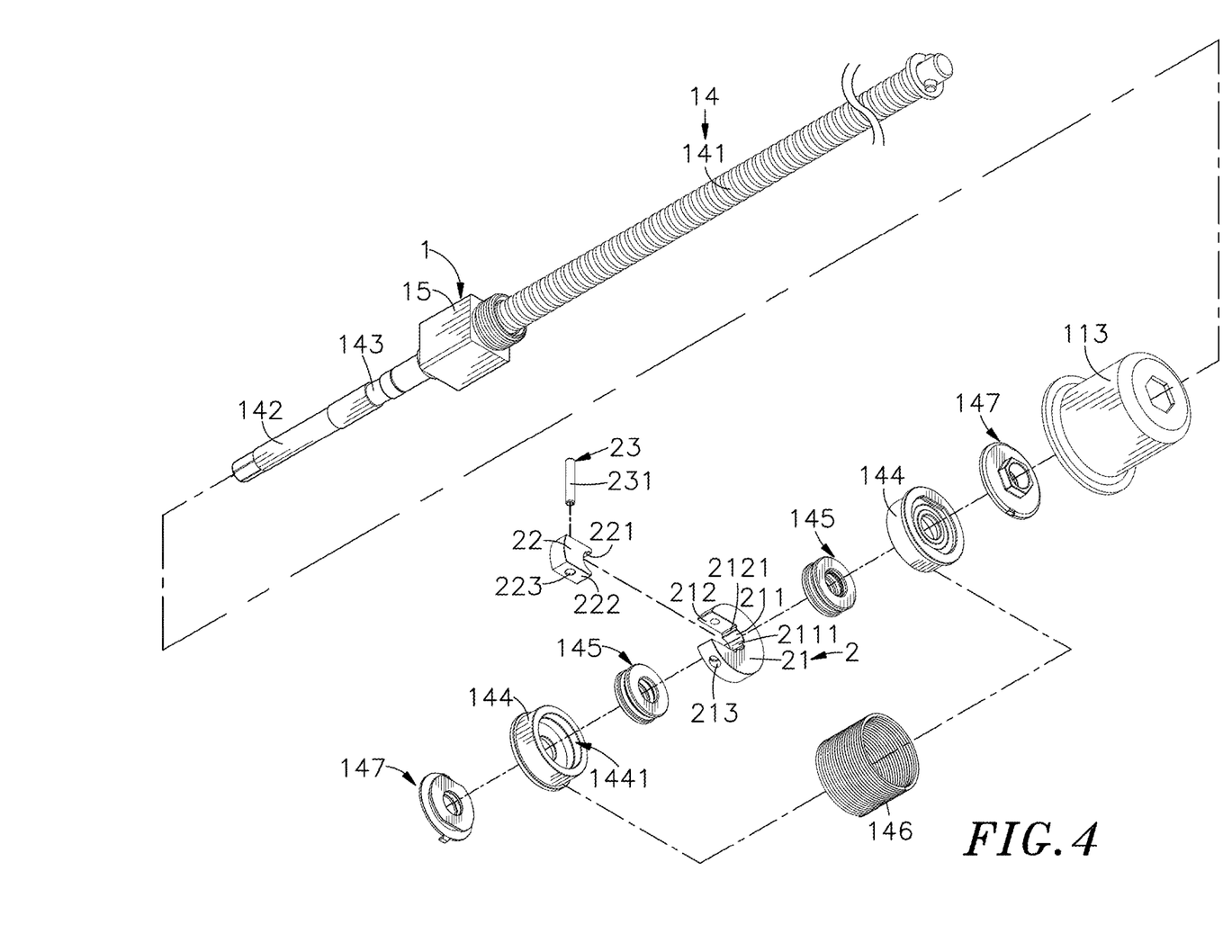
FIG. 4 corresponds to FIG. 3 when viewed from another angle.

The transmission mechanism 14 further comprises two bearing housings 144 sleeved onto the axial rod 142 of the lead screw 141 at opposing front and rear ends of the neck 143 to face each other and respectively defining therein a receiving chamber 1441, two thrust bearings 145 coaxially sleeved onto the axial rod 142 and respectively accommodated in the receiving chambers 1441 of the bearing housings 144, a spring member 146 mounted around and stopped between the bearing housings 144, and two connection devices 147 coaxially sleeved onto the axial rod 142 and respectively disposed at two opposite sides relative to the two bearing housings 144. Each connection device 147 includes a gasket attached the associating bearing housing 144 at a front (rear) side, and a friction wheel and a positioning plate properly attached to the gasket opposite to the associating bearing housing 144. The positioning plates of the connection devices 147 are respectively affixed to the cover plate 112 and the outer casing 113. Further, the lead screw 141 has an outer thread 1411. The actuator body 1 further comprises actuation member 15. The actuation member 15 defines therein a screw hole 151. The screw hole 151 is threaded onto the outer thread 1411 of the lead screw 141 outside the housing 11 so that when the lead screw 141 is rotated, the actuation member 15 is caused to move axially.

The stopper component set 2 is accommodated in the receiving chamber 1130 of the outer casing 113 of the housing 11 between the two bearing housings 144, comprising a first stopper block 21 and a second stopper block 22 respectively fastened to the neck 143 of the lead screw 141. The first stopper block 21 has an attachment hole 211 located at the center and radially attached onto the neck 143, a protruding portion (or integrated locating block or flat key) 2111 radially protruded from the peripheral wall of the attachment hole 211 and engaged into the position-limiting groove 1431, a mating connection groove 212 formed in the peripheral wall of the attachment hole 211 and extended to the outer perimeter of the first stopper block 21 in a reversed direction relative to the protruding portion 2111, two steps 2121 respectively formed on opposing top and bottom walls of the mating connection groove 212 adjacent to the attachment hole 211, and a through hole 213 vertically cut through the first stopper block 21 across the mating connection groove 212.

The second stopper block 22 is radially engaged into the mating connection groove 212 of the first stopper block 21, comprising an inwardly curved wall 221 attached onto the neck 143 and mating with the attachment hole 211 to form a round hole that receives the neck 143, two cut planes 222 respectively located on opposing top and bottom sides thereof and abutted to the opposing top and bottom walls of the mating connection groove 212, two abutment walls 2221 respectively extended from the inwardly curved wall 221 and respectively abutted against the respective steps 2121, and a through hole 223 perpendicularly cut through the two cut planes 222 and disposed in communication with the through hole 213 of the first stopper block 21. The stopper component set 2 further comprises a fastening member 23. A tightening pin 231 of the fastening member 23 is inserted into the through hole 213 of the first stopper block 21 and the through hole 223 of the second stopper block 22 to secure the first stopper block 21 and the second stopper block 22 together. However, the tightening pin 231 is not a limitation. Alternatively, the fastening member 23 can be a screw for fastening the first stopper block 21 and the second stopper block 22 together.

The linear actuator of the present invention can be used in an external equipment (such as medical or residential beds, massage chairs, fitness and rehabilitation related equipment, etc.), door/window opening machine, lifting mechanism or other equipment. In installation, the body shell 111 of the housing 11 and the lead screw 141 of the transmission mechanism 14 is connected to the link or support frame of the external equipment by means of the actuation member 15 or its connected telescopic tube set. When the motor 131 of the drive unit 13 is activated to rotate the meshed gear set 12 meshed with the drive shaft 132, the gear set 12 drives the lead screw 141 to rotate, causing the actuation member 15 to linearly move the telescopic tube set.

Figure 7:
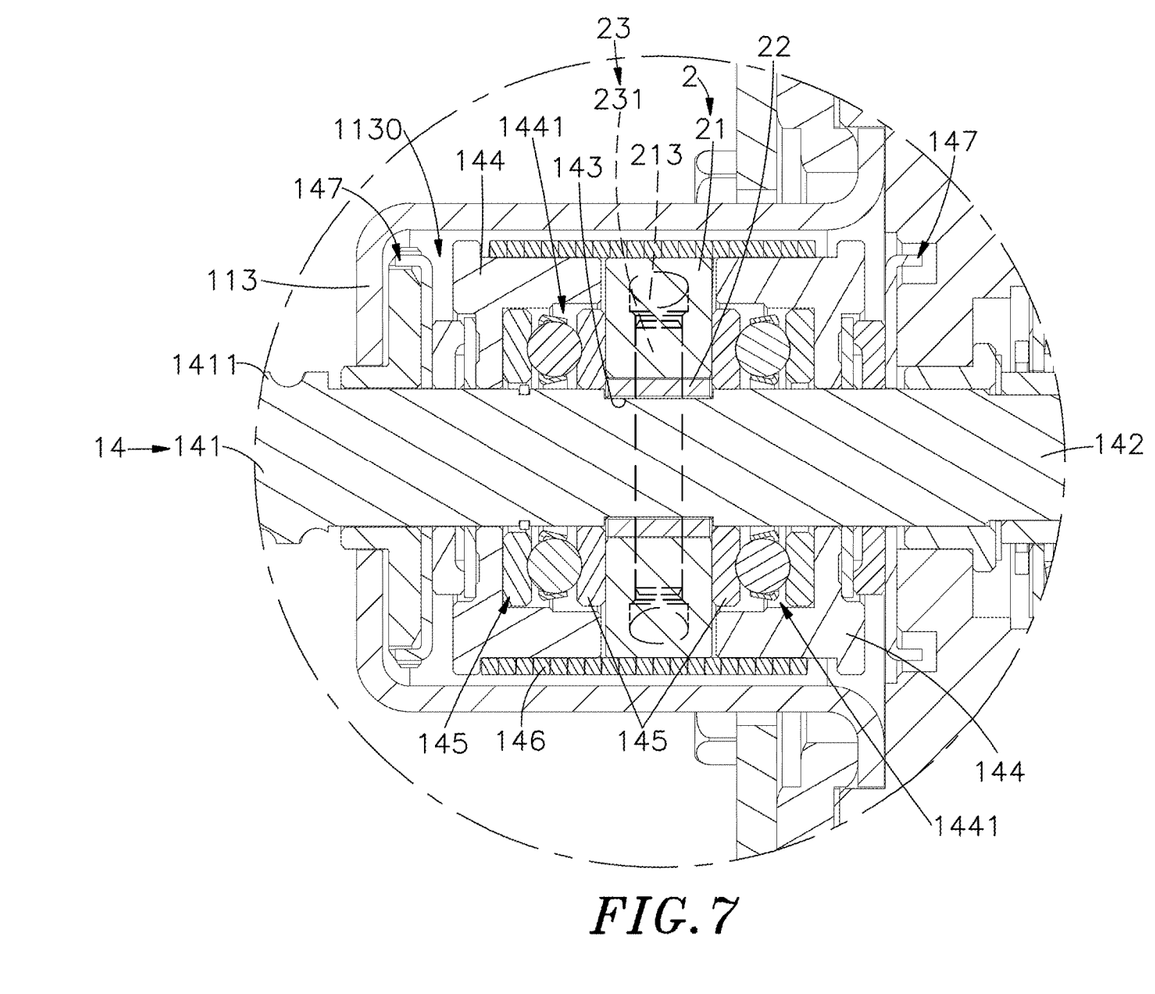
FIG. 7 is an enlarged view of a part of FIG. 6.
Figure 8:
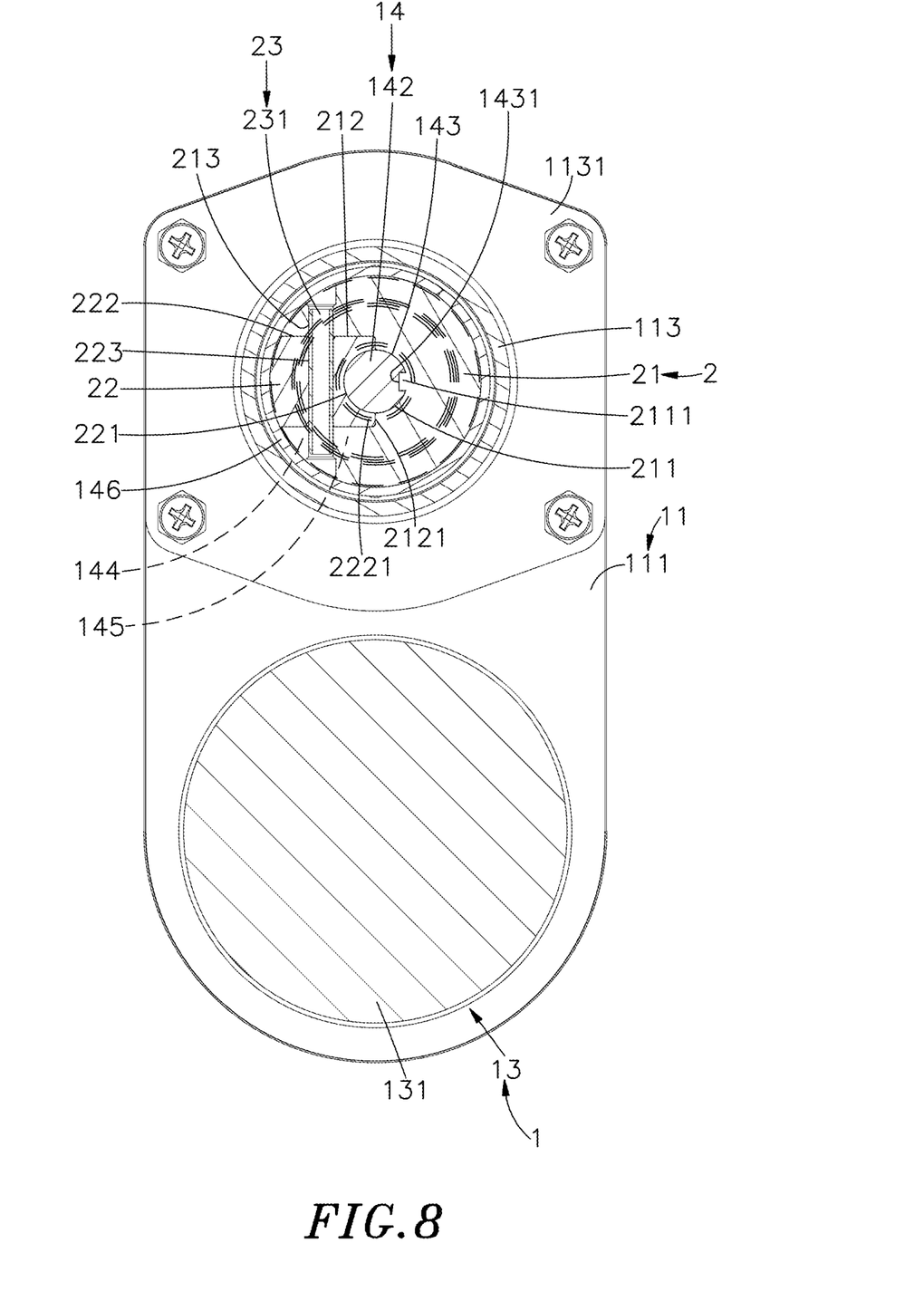
FIG. 8 is a sectional front view of the linear actuator in accordance with the present invention.

During the rotation of the lead screw 141 of the transmission mechanism 14, since the protruding portion 2111 of the first stopper block 21 of the stopper component set 2 is engaged in the position-limiting groove 1431 of the neck 143, rotation of the axial rod 142 with the lead screw 141 of the transmission mechanism 14 causes the stopper component set 2 to rotate, forcing the two thrust bearings 145 in the two bearing housings 144 to clamp on the first stopper block 21 and the second stopper block 22, prohibiting the lead screw 141 from falling out of the outer casing 113 during its rotary motion. Subject to the low friction resistance of the rotation of the balls of the thrust bearings 145, the lead screw 141 drives the stopper component set 2 to rotate stably and smoothly.

Further, the stopper component set 2 uses the fastening member 23 to fasten the first stopper block 21 and the second stopper block 22 to the neck 143 of the lead screw 141 and the protruding portion 2111 in the attachment hole 211 to engage the position-limiting groove 1431 on the neck 143, thus, when the lead screw 141 is rotated forward or backward, the stopper component set 2 is forced to axially stop against one respective thrust bearing 145, enabling the linear actuator to carry greater axial thrust or tensile load and increasing the high impact load strength of the linear actuator. Further, this design eliminates the necessity to create a pin hole through the lead screw for the insertion of a pin.

Creating a pin hole through the lead screw will reduce the cross-sectional strength of the lead screw, and the lead screw can break at the area around pin hole upon an impact when the lead screw bears excessive torque load. Thus, the design of the present invention ensures the transmission stability and reliability of the lead screw 141. Further, the structural design of the stopper component set 2 for mounting on the neck 143 avoids structural damage to the lead screw 141, achieving security requirements.

As described above, the housing 11 of the actuator body 1 houses the gear set 12 that is drivable by the drive unit 13 and coupled with the lead screw 141 of the transmission mechanism 14; the neck 143 of the axial rod 142 is mounted with the stopper component set 2; the thrust bearings 145 are respectively mounted in the respective bearing housings 144 that are mounted on the axial rod 142 at the opposing front and rear ends of the neck 143; the stopper component set 2 includes the first stopper block 21 fastened to the neck 143, the second stopper block 22 engaged in the first stopper block 21, and the fastening member 23 inserted through the first stopper block 21 and the second stopper block 22 to fasten the first stopper block 21 and the second stopper block 22 together; the engagement structure between the first stopper block 21 and the neck 143 can force the stopper component set 2 to axially stop against the thrust bearings 145, ensuring positive positioning of the lead screw 141 when it is rotated forward or backward and enabling the linear actuator to carry greater axial thrust or tensile load and increasing its high impact load strength to ensure overall transmission stability and reliability.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A linear actuator, comprising:
an actuator body comprising a housing defining therein an accommodation chamber, a gear set accommodated in said accommodation chamber, a drive unit mounted outside said housing and adapted for rotating said gear set and a transmission mechanism, said transmission mechanism comprising a lead screw extending out of said housing, said lead screw comprising an axial rod located at one end thereof and connected to said gear set, a neck located on said axial rod, two bearing housings respectively sleeved onto said axial rod and respectively disposed adjacent to opposing front and rear ends of said neck to face each other and two thrust bearings respectively mounted in said bearing housings around said axial rod; and
a stopper component set comprising a first stopper block fastened to said neck, a second stopper block fastened to said neck and a fastening member fastening said first stopper block and said second stopper block together, said first stopper block comprising an attachment hole located at a center thereof and radially attached to said neck and a mating connection groove extended from said attachment hole, said second stopper block being inserted into said mating connection groove, said second stopper block comprising an inwardly curved wall attached onto said neck to abut against said attachment hole.

2. The linear actuator as claimed in claim 1, wherein said housing of said actuator body comprises a body shell, a cover plate and an outer casing, said cover plate being fastened to an opening at a front side of said body shell, said outer casing being fastened to and protruded from said cover plate and defining therein a receiving chamber; said stopper component set is accommodated in said receiving chamber of said outer casing and set between said two bearing housings such that said two thrust bearings are clamped on said first stopper block and said second stopper block for stopping against said thrust bearings upon rotation of said stopper component set with said lead screw.

3. The linear actuator as claimed in claim 2, wherein said outer casing is mounted with a hollow holding down member that is affixed to said cover plate to firmly secure said outer casing to said cover plate.

4. The linear actuator as claimed in claim 2, wherein said transmission mechanism further comprises two connection devices coaxially sleeved onto said axial rod of said lead screw and respectively disposed at two opposite sides relative to said two bearing housings.

5. The linear actuator as claimed in claim 1, wherein said gear set of said actuator body comprises a plurality of meshed gears and a mounting through hole cut through a center of one said meshed gear and coaxially attached onto said axial rod of said lead screw; said drive unit comprises a motor, and a drive shaft inserted into said housing and meshed with said gear set and drivable by said motor to rotate said gear set; said lead screw is selectively disposed in a parallel or perpendicular relationship with said motor.

6. The linear actuator as claimed in claim 1, wherein said lead screw of said actuator body comprises an outer thread; said transmission mechanism further comprises an actuation member, said actuation member comprising a screw hole threaded onto said outer thread of said lead screw outside said housing.

7. The linear actuator as claimed in claim 1, wherein said axial rod of said lead screw further comprises a position-limiting groove axially located on the periphery of said neck; said first stopper block of said stopper component set further comprises a protruding portion radially protruded from the peripheral wall of said attachment hole and engaged into said position-limiting groove, and a mating connection groove formed in the peripheral wall of said attachment hole and extended to the outer perimeter of said first stopper block in a reversed direction relative to said protruding portion.

8. The linear actuator as claimed in claim 7, wherein said first stopper block further comprises two steps respectively formed on opposing top and bottom walls of said mating connection groove adjacent to said attachment hole; said second stopper block further comprises two cut planes respectively located on opposing top and bottom sides thereof and abutted to opposing top and bottom walls of said mating connection groove, and two abutment walls respectively extended from said inwardly curved wall and respectively abutted against said steps of said first stopper block.

9. The linear actuator as claimed in claim 1, wherein said first stopper block of said stopper component set further comprises a through hole extending across said mating connection groove; said second stopper block further comprises two cut planes respectively located on opposing top and bottom sides thereof and abutted to opposing top and bottom walls of said mating connection groove, and a through hole perpendicularly cut through said two cut planes and disposed in communication with the said through hole of said first stopper block; said stopper component set further comprises a fastening member inserted into the said through hole of said first stopper block and the said through hole of said second stopper block to secure said first stopper block and said second stopper block together.

10. The linear actuator as claimed in claim 9, wherein said fastening member is a tightening pin.

\* \* \* \* \*